(12) United States Patent
Su

(10) Patent No.: US 12,451,726 B2
(45) Date of Patent: Oct. 21, 2025

(54) WIRELESS CHARGING SYSTEM AND ITS CHARGING STATION

(71) Applicant: SUPER GROUP SEMICONDUCTOR CO., LTD., Hsinchu County (TW)

(72) Inventor: Jen-Jun Su, Hsinchu County (TW)

(73) Assignee: SUPER GROUP SEMICONDUCTOR CO., LTD., Hsinchu County (TW)

( * ) Notice: Subject to any disclaimer, the term of this patent is extended or adjusted under 35 U.S.C. 154(b) by 921 days.

(21) Appl. No.: 17/651,241

(22) Filed: Feb. 15, 2022

(65) Prior Publication Data

US 2023/0035566 A1 Feb. 2, 2023

(30) Foreign Application Priority Data

Jul. 30, 2021 (TW) .................. 110128177

(51) Int. Cl.
| H02J 7/14 | (2006.01) |
| H02J 7/00 | (2006.01) |
| H02J 50/00 | (2016.01) |
| H02J 50/10 | (2016.01) |
| H02J 50/40 | (2016.01) |

(52) U.S. Cl.
CPC .......... *H02J 50/005* (2020.01); *H02J 7/0042* (2013.01); *H02J 50/10* (2016.02); *H02J 50/402* (2020.01)

(58) Field of Classification Search
CPC ........ H02J 50/005; H02J 50/10; H02J 50/402; H02J 50/0042
USPC ....................................................... 320/134
See application file for complete search history.

(56) References Cited

U.S. PATENT DOCUMENTS

| 5,216,402 A | * | 6/1993 | Carosa | B60L 53/12 336/83 |
| 5,306,999 A | * | 4/1994 | Hoffman | B60L 53/16 320/109 |
| 5,341,083 A | * | 8/1994 | Klontz | H02J 7/0042 320/109 |
| 5,461,299 A | * | 10/1995 | Bruni | B60L 53/305 320/108 |
| 5,463,303 A | * | 10/1995 | Hall | H02J 50/10 336/83 |
| 5,617,003 A | * | 4/1997 | Odachi | B60L 53/35 320/108 |
| 5,710,502 A | * | 1/1998 | Poumey | B60L 53/122 320/108 |

(Continued)

FOREIGN PATENT DOCUMENTS

CN 103795131 A 5/2014
CN 104269944 A 1/2015

(Continued)

*Primary Examiner* — Alexis B Pacheco
(74) *Attorney, Agent, or Firm* — CKC & Partners Co., LLC

(57) ABSTRACT

A wireless charging system includes a power transmitting module and a power receiving module. The power transmitting module includes a first charging head and a plurality of first coils which are located on the first charging head and connected in parallel with each other. The power receiving module includes a second charging head and a plurality of second coils which are located on the second charging head and connected in parallel with each other. Thus, when the first charging head docks to the second charging head, each of the first coils faces to one of the second coils.

20 Claims, 15 Drawing Sheets

(56) References Cited

U.S. PATENT DOCUMENTS

| | | | | |
|---|---|---|---|---|
| 5,850,135 A * | 12/1998 | Kuki | B60L 53/665 | 320/108 |
| 6,127,800 A * | 10/2000 | Kuki | B60L 53/126 | 320/108 |
| 7,906,936 B2 * | 3/2011 | Azancot | H02J 7/0042 | 320/108 |
| 8,164,222 B2 * | 4/2012 | Baarman | H02J 50/80 | 307/104 |
| 9,124,141 B2 * | 9/2015 | Amma | H02J 50/20 | |
| 10,343,535 B2 * | 7/2019 | Cook | B60L 53/38 | |
| 2011/0018360 A1 * | 1/2011 | Baarman | H02J 50/12 | 307/104 |
| 2011/0148350 A1 * | 6/2011 | Wegener | B60L 53/12 | 320/108 |
| 2012/0086394 A1 * | 4/2012 | Hui | G05D 1/0038 | 320/108 |
| 2013/0099730 A1 * | 4/2013 | Yoon | H05K 3/4691 | 320/108 |
| 2013/0106198 A1 * | 5/2013 | Kuk | H02J 50/70 | 336/200 |
| 2018/0198310 A1 * | 7/2018 | Hwang | H05K 7/20472 | |
| 2019/0006826 A1 * | 1/2019 | Islinger | H02G 3/0418 | |
| 2019/0140492 A1 * | 5/2019 | Beyer | H04B 5/263 | |
| 2019/0344668 A1 | 11/2019 | Penney | | |
| 2020/0251929 A1 * | 8/2020 | Partovi | H01F 38/14 | |
| 2022/0032800 A1 * | 2/2022 | Naganishi | B60L 53/14 | |

FOREIGN PATENT DOCUMENTS

| | | |
|---|---|---|
| CN | 109228902 A | 1/2019 |
| CN | 109873478 A | 6/2019 |
| CN | 110014912 A | 7/2019 |
| CN | 212950907 U | 4/2021 |
| CN | 112776621 A | 5/2021 |
| TW | M510005 U | 10/2015 |
| TW | M511158 U | 10/2015 |
| TW | 201812809 A | 4/2018 |
| TW | M612915 U | 6/2021 |

* cited by examiner

WIRELESS CHARGING SYSTEM AND ITS CHARGING STATION

RELATED APPLICATIONS

This application claims priority to Taiwan Application Serial Number 110128177, filed on Jul. 30, 2021, which is herein incorporated by reference.

BACKGROUND

Field of Disclosure

The present disclosure relates to a wireless charging system. More particularly, the present disclosure relates to a wireless charging system capable of charging through coils.

Description of Related Art

Recently, wireless charging technology has been widely used in charging tasks of electric vehicles. For example, when an electric car is parked at a charging station, a power supply coil of the charging station is induced to a receiving coil of the electric car so as to provide the required electric power for the electric car.

However, for quickly giving large amount of electric power, the power supply coil of the charging station is inevitably provided with huge size, which will cause problems of occupying space and obstructing aesthetics. In this way, the related contractor usually makes the power supply coil to be buried under the ground of a parking area so as to provide charging service for the electric vehicle parked thereon.

Nevertheless, the installation of a large-amount power supply coil is quite complicated and time-consuming. It not only requires to proceed construction works such as excavation, wire drawing and restoration, which cause a large amount of unacceptable noise, but also needs to overcome difficulties to obtain construction permission from the management committee.

Accordingly, the above technology is apparently provided with inconvenience and shortages, and required to be further improved. Therefore, how to provide a solution to effectively overcome the aforementioned inconvenience and shortages is a serious concern for many industries.

SUMMARY

One aspect of the present disclosure is to provide a wireless charging system and its charging station to solve the aforementioned problems of the prior art.

In one embodiment of the present disclosure, a wireless charging system includes a power transmitting module and a power receiving module. The power transmitting module includes a first charging head and a plurality of first coils which are located on the first charging head and connected in parallel with each other. The power receiving module includes a second charging head and a plurality of second coils which are located on the second charging head and connected in parallel with each other. Thus, when the first charging head docks to the second charging head, each of the first coils faces and couples to one of the second coils.

According to one or more embodiments of the present disclosure, in the wireless charging system, the first charging head is provided with a first surface on which the first coils are sequentially arranged. Each of the first coils has a center axis, and the center axes of the first coils are parallel to each other. The second charging head is provided with a second surface on which the second coils are sequentially arranged. Each of the second coils has a center axis, and the center axes of the second coils are parallel to each other. When the first charging head docks to the second charging head, the second surface faces the first surface, and the center axis of each of the first coils is coaxial to the center axis of one of the second coils.

According to one or more embodiments of the present disclosure, in the wireless charging system, the first coils are arranged in the first charging head. Each of the first coils has a center axis, and the center axes of the first coils are coaxial. The second coils are arranged in the second charging head, each of the second coils has a center axis, and the center axes of the second coils are coaxial. When the first charging head docks to the second charging head, the first coils are located between the second coils, and the center axes of the first coils and the center axes of the second coils are coaxial.

According to one or more embodiments of the present disclosure, in the wireless charging system, the second charging head is formed with a slot, the second coils are disposed in the second charging head, and the slot is disposed between the second coils. The first charging head is provided with an insertion member, the first coils are disposed in the insertion member, each of the first coils has a center axis, and the center axes of the first coils are coaxial. When the first charging head docks to the second charging head, the insertion member extends into the slot so that the center axis of each of the first coils is coaxial to the center axis of the corresponding one of the second coils.

According to one or more embodiments of the present disclosure, in the wireless charging system, the slot is provided with two inner surfaces which are opposite to each other, and the second coils faces the inner surfaces, respectively. The insertion member is provided with two outer sides which are opposite to each other, and the first coils faces the outer sides of the insertion member, respectively.

According to one or more embodiments of the present disclosure, in the wireless charging system, the second charging head is formed with a plurality of slots sequentially arranged on one surface of the second charging head, and each of the slots is provided with two inner surfaces which are opposite to each other, and the inner surfaces of each of the slots are respectively installed with one of the second coils. The first charging head is provided with a plurality of insertion members, and each of the insertion members is installed with one of the first coils. When the insertion members extend into the slots, respectively, each of the first coils is interposed between any two neighboring ones of the second coils.

According to one or more embodiments of the present disclosure, in the wireless charging system, the second charging head is formed with a plurality of slots sequentially arranged on one surface of the second charging head, and each of the slots is provided with two inner surfaces which are opposite to each other, and one of the inner surfaces of each of the slots is installed with one of the second coils. The first charging head is provided with a plurality of insertion members, and one side of each of the insertion members is installed with one of the first coils. When the insertion members extend into the slots, respectively, each of the second coils of one of the slots faces the one of the first coils of the corresponding one of the insertion members.

According to one or more embodiments of the present disclosure, in the wireless charging system, an isolation body is provided between two adjacent ones of the first coils or two adjacent ones of the second coils.

According to one or more embodiments of the present disclosure, in the wireless charging system, the first charging head includes a first case body having a first surface thereon. The first coils are respectively arranged in the first case body, and the center axis of each of the first coils is perpendicular to the first surface. The second charging head includes a second case body having a second surface thereon, and an elongated groove formed on the second surface for receiving the first case body. The second coils are respectively arranged in the second case body, and the center axis of each of the second coils is perpendicular to the second surface.

According to one or more embodiments of the present disclosure, in the wireless charging system, the first charging head includes a plurality of first concave portions disposed on the first surface of the first case body. Each of the first coils is embedded inside the first case body and faces one of the first concave portions. The second charging head includes a plurality of second concave portions disposed within the elongated groove, wherein each of the second coils is embedded inside the second case body and faces one of the second concave portions.

In one embodiment of the present disclosure, a wireless charging system includes a power transmitting module and a power receiving module. The power transmitting module includes a first charging head and at least one first coil. The first charging head includes a first case body having a first surface thereon. The first coil is embedded inside the first case body, and a center axis of the first coil is perpendicular to the first surface. The power receiving in module includes a second charging head and at least one second coil. The second charging head includes a second case body having a second surface thereon, and a groove is formed on the second surface. The second coil is embedded inside the second case body and faces the groove. Thus, when the first charging head docks to the second charging head, the first case body is received into the groove, and the first coil couples to the second coil.

According to one or more embodiments of the present disclosure, in the wireless charging system, the first charging head further includes at least one first concave portion disposed on the first surface of the first case body, and the first coil faces the first concave portion in the first case body. The second charging head further includes at least one second concave portion formed on a bottom surface of the groove to be in communication with the groove, and the second coil faces the second concave portion inside the second case body, and the first coil couples to the second coil through the first concave portion and the second concave portion.

According to one or more embodiments of the present disclosure, in the wireless charging system, when the at least one second concave portion is plural, the groove is an elongated groove. When the first case body is received into the elongated groove along an insertion direction, the first concave portion and the first coil are located in the elongated groove so that the center axis of the first coil is parallel to the insertion direction.

According to one or more embodiments of the present disclosure, in the wireless charging system, the power transmitting module further includes a base having an accommodating recess for removably accommodating the first charging head therein.

According to one or more embodiments of the present disclosure, in the wireless charging system, the base further includes a first portion, a second portion and a transporting module. The charging head is disposed on the first portion, and the transporting module is connected to the first portion and the second portion for moving the first charging head relative to the second portion.

In one embodiment of the present disclosure, a charging station includes a base including a charging head, and a plurality of first coils which are located on the charging head and connected in parallel with each other for facing to and coupling to second coils of a moving apparatus.

According to one or more embodiments of the present disclosure, in the charging station, the first coils are sequentially arranged in the charging head, each of the first coils has a center axis, and the center axes of the first coils are parallel to each other.

According to one or more embodiments of the present disclosure, in the charging station, the first coils are sequentially arranged in the charging head, each of the first coils has a center axis, and the center axes of the first coils are coaxial.

According to one or more embodiments of the present disclosure, in the charging station, the base further includes an accommodating recess formed on the base for removably accommodating the charging head therein.

According to one or more embodiments of the present disclosure, in the charging station, the base further includes a first portion, a second portion and a transporting module. The charging head is disposed on the first portion, and the transporting module is connected to the first portion and the second portion for moving the charging head relative to the second portion.

Thus, through the construction of the embodiments above, the present disclosure is allowed to minimize the volume of the power supply coil, and avoid from proceeding construction works under the ground, thereby reducing the cost and man-hours, and increasing the user's installation willingness.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
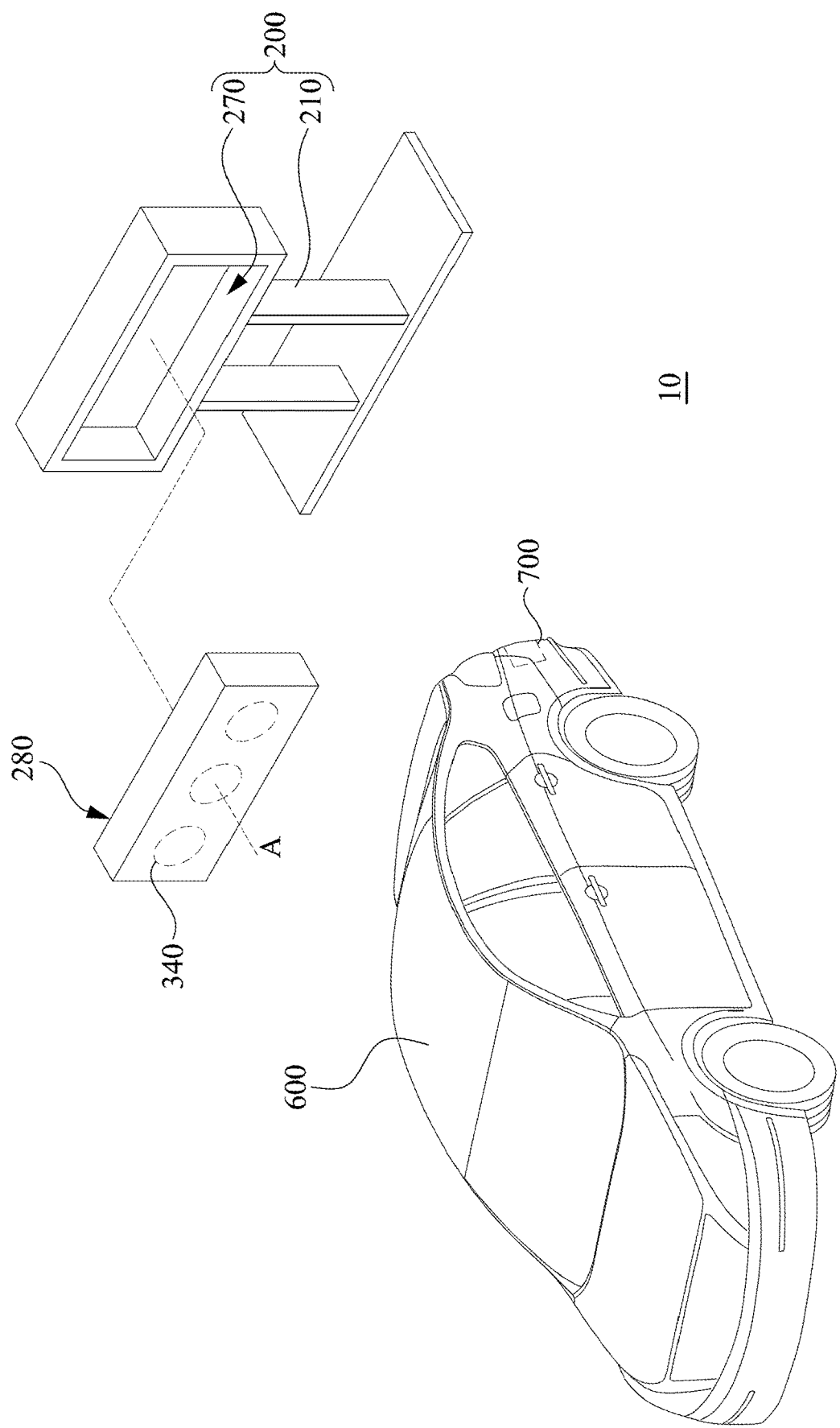
FIG. 1 is a schematic view of a wireless charging system according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
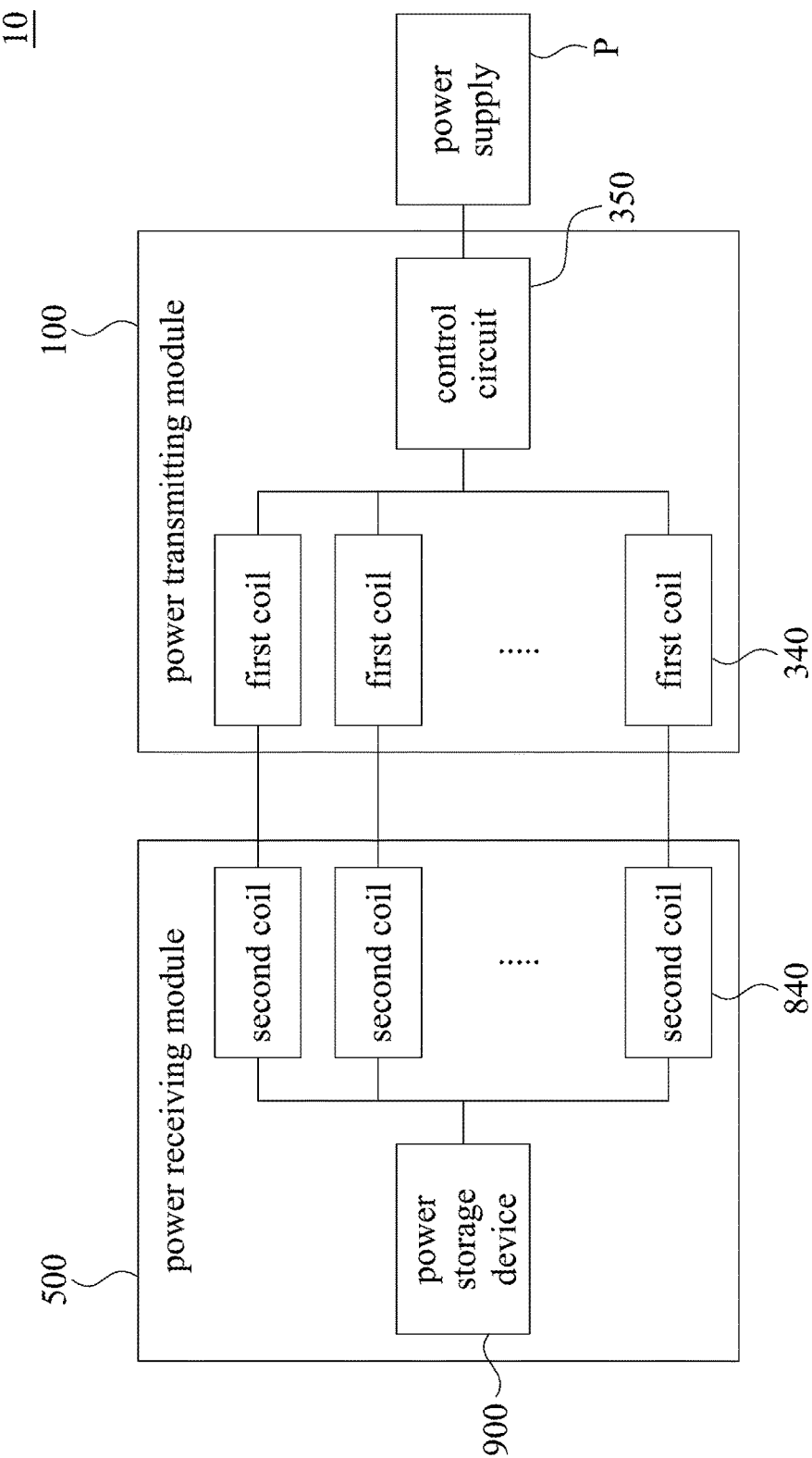
FIG. 2 is an electrical block diagram of the wireless charging system of FIG. 1.

Reference is now made to FIG. 1 to FIG. 2, in which FIG. 1 is a schematic view of a wireless charging system 10 according to one embodiment of the present disclosure, and FIG. 2 is an electrical block diagram of the wireless charging system 10 of FIG. 1. As shown in FIG. 1 to FIG. 2, the wireless charging system 10 includes a power transmitting module 100 and a power receiving module 500. The power transmitting module 100 includes a first charging head 280, a plurality of first coils 340 and a control circuit 350. The first coils 340 are spaced arranged on the first charging head 280, and the first coils 340 are connected in parallel with each other. The control circuit 350 is electrically connected to the first coils 340, and connected to a power supply P located outside the power transmitting module 100 for converting electric power from the power supply P and transmit it to the first coils 340. The power receiving module 500 includes a second charging head 700, a plurality of second coils 840 and a power storage device 900. The second coils 840 are located on the second charging head 700, and the second coils 840 are connected in parallel with each other. The power storage device 900 is electrically connected to the second coils 840.

Thus, when the first charging head 280 docks to the second charging head 700, each of the first coils 340 faces and couples to one of the second coils 840 so that the second coil 840 can generate and send electric power to the power storage device 900 for charging the power storage device 900.

For example, the wireless charging system 10 further includes a charging station 200 and a moving apparatus 600. The charging station 200 includes a base 210 and an accommodating recess 270. The accommodating recess 270 is formed on the base 210 for accommodating the first charging head 280 therein, and the first charging head 280 is removably disposed in the accommodating recess 270. In other embodiments, the first charging head 280 may also be fixed in the accommodating recess 270. The moving apparatus 600 is an electric vehicle, and the second charging head 700 may be built-in a rear compartment of the electric vehicle or fixed outside the rear compartment, however, the disclosure is not limited to this.

It is noted, the first coil 340 and the second coil 840 are respectively spiral or concentric to respectively surround an opening having a center axis A. each of the first coils 340 faces and overlaps each of the second coils 840, and the center axis A of each of the first coils 340 is coaxial to the center axis A of one of the second coils 840.

Figure 3A:
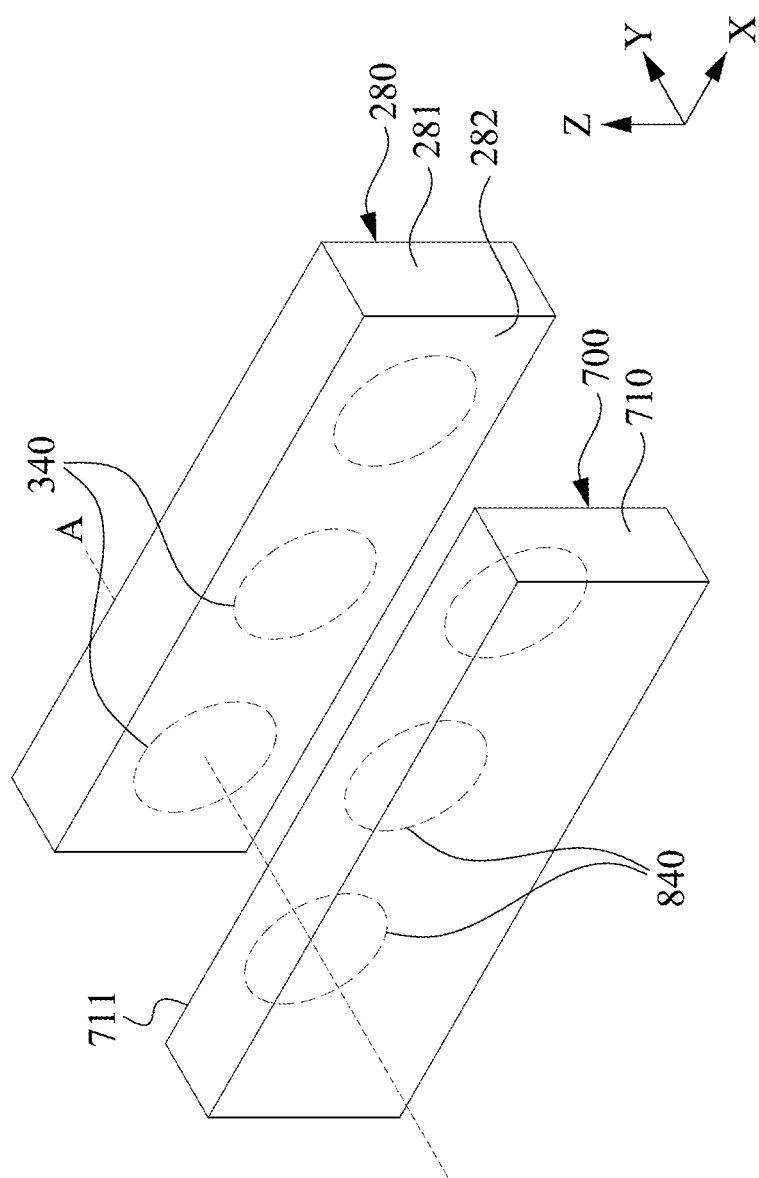
FIG. 3A is a schematic view of a first charging head and a second charging head according to one embodiment of the present disclosure.
Figure 3B:
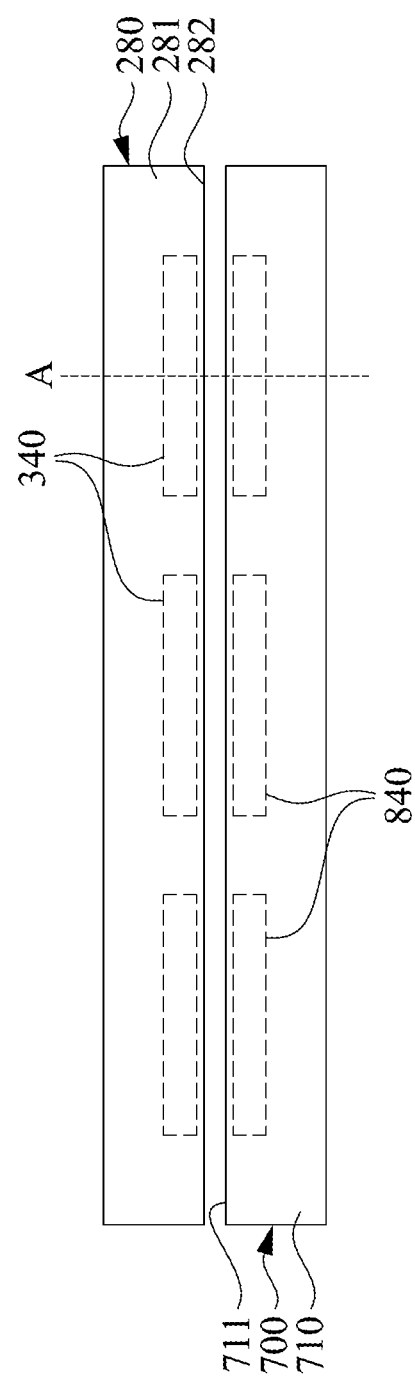
FIG. 3B is a schematic view of the first charging head docking to the second charging head in FIG. 3A.

FIG. 3A is a schematic view of a first charging head 280 and a second charging head 700 according to one embodiment of the present disclosure. FIG. 3B is a schematic view of the first charging head 280 docking to the second charging head 700 in FIG. 3A. As shown in FIG. 3A to FIG. 3B, the first charging head 280 includes a first case body 281. The first case body 281 includes a first surface 282 that is elongated. The first coils 340 are sequentially arranged in the first case body 281 near the first surface 282 of the first case body 281. For example, the first surface 282 extends in a first extending direction (e.g., X axis direction), and the first coils 340 are arranged in a single row near the first surface 282 of the first case body 281 in the first extending direction (e.g., X axis direction), and the axes A of the first coils 340 are parallel to each other. However, the disclosure is not limited to this arrangement. The axis A of each of the first coils 340 is perpendicular to the first surface 282. The center axis A of each of the first coils 340 is perpendicular to the first surface 282 of the first case body 281. The second charging head 700 includes a second case body 710. The second case body 710 includes a second surface 711 that is elongated. The second coils 840 are sequentially arranged in the second case body 710 near the second surface 711 of the second case body 710. For example, the second surface 711 extends in a second extending direction (e.g., X axis direction), and the second coils 840 are arranged in a single row near the second surface 711 of the second case body 710 in the second extending direction (e.g., X axis direction). However, the disclosure is not limited to this arrangement. The center axis A of each of the second coils 840 is perpendicular to the second surface 711 of the second case body 710.

It is noted, in the embodiment, the first coils 340 arranged on the first surface 282 mentioned above is indicated that each of the first coils 340 can be installed in an inner space of the first case body 281 to be in contact with the first surface 282 or to be located at a corresponding position approximated to the first surface 282. Alternatively, each of the first coils 340 can be completely embedded inside a solid body of the first case body 281 to be in contact with the first surface 282 or located at a corresponding position approximated to the first surface 282. The second coils 840 arranged on the second surface 711 mentioned above is indicated that each of the second coils 840 can be installed in an inner space of the second case body 710 to be in contact with the second surface 711 or to be located at a corresponding position approximated to the second surface 711. Alternatively, each of the second coils 840 can be completely embedded inside a solid body of the second case body 710 to be in contact with the second surface 711 or located at a corresponding position approximated to the second surface 711.

Thus, as shown in FIG. 3B, when the first charging head 280 docks to the second charging head 700, the second surface 711 of the second case body 710 faces the first surface 282 of the first case body 281, and the second surface 711 of the second case body 710 is spaced from the first surface 282 of the first case body 281. Each of the first coils 340 is aligned with one of the second coils 840, the first coil 340 and the second coil 840 aligned with each other are overlapped, and a separation is formed between the first coil 340 and the second coil 840. Each group of the first coils 340 and the second coils 840 aligned with each other may have center axe A that are coaxial.

In one embodiment, as the first coil 340 is embedded inside the first case body 281 opposite to the first surface 282, and the second coil 840 is embedded inside the second case body 710 opposite to the second surface 711, the first surface 282 of the first case body 281 and the second surface 711 of the second case body 710 can also be in closed contact with each other. In one embodiment, the second case body 710 can be secured to the first case body 281 through a coupling method such as magnetic attraction, snapping and alike, so that each of the first coils 340 is aligned with one of the second coil 840 for improving the charging efficiency. In one embodiment, the wireless charging system in the embodiment can adopt magnetic resonance charging technology to meet the requirements of high-power vehicle charging. For the magnetic resonance charging technology, a certain distance is needed to be maintained between the first coil 340 and the second coil 840 for providing better charging efficiency. Since the charging efficiency will be reduced when the first coil 340 and the second coil 840 aligned with each other are too close, a distance from the first coil 340 to the first surface 282 and a distance from the second coil 840 to the second surface 711 which are mentioned in the disclosure can be adoptively adjusted.

Figure 4B:
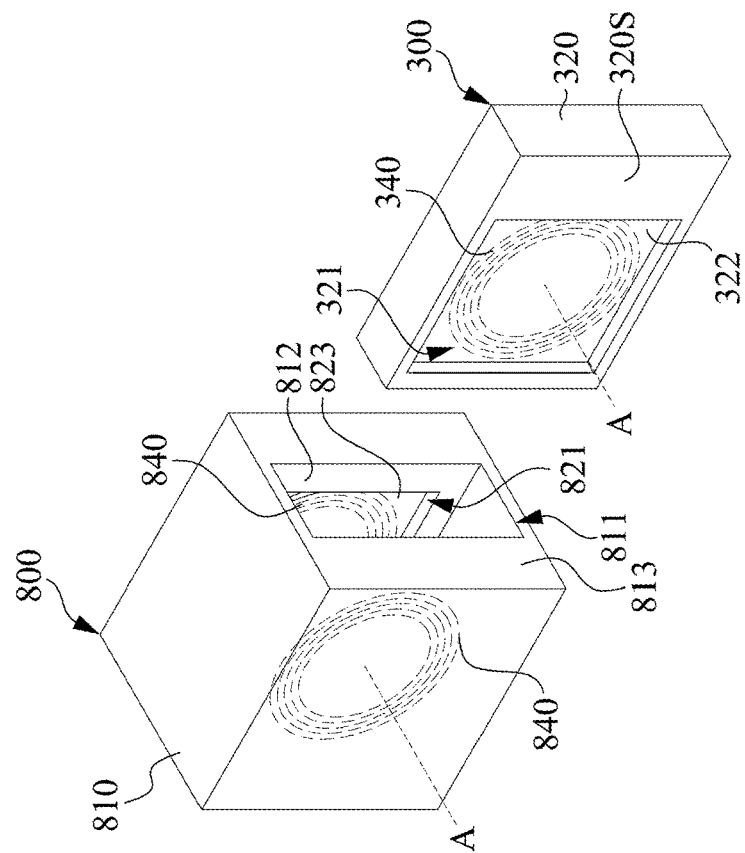
FIG. 4B is a schematic view of the first charging head and the second charging head of FIG. 4A observed from another aspect.
Figure 4A:
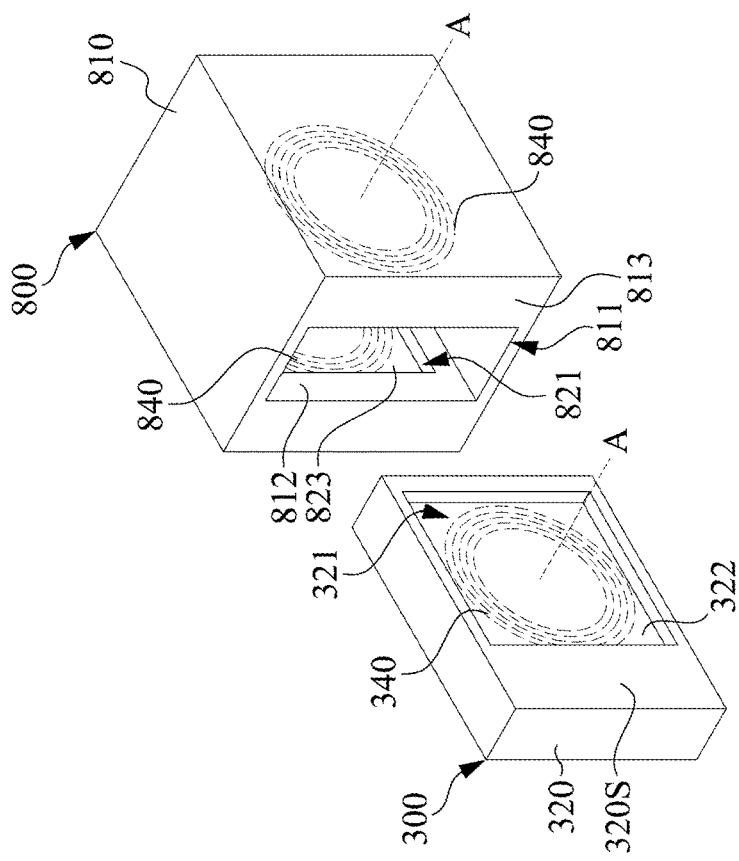
FIG. 4A is a schematic view of a first charging head and a second charging head, which is observed from one aspect according to one embodiment of the present disclosure.
Figure 4C:
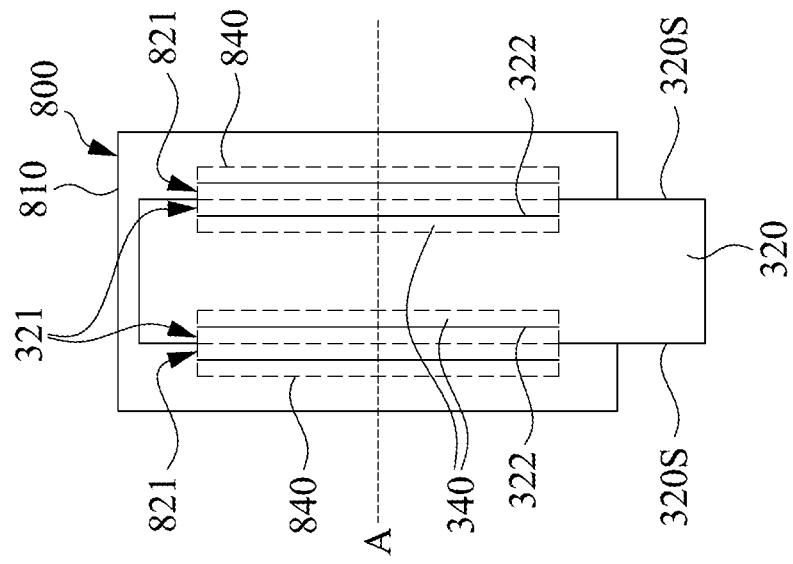
FIG. 4C is a schematic view of the first charging head docking to the second charging head in FIG. 4A.

FIG. 4A is a schematic view of a first charging head 300 and a second charging head 800, which is observed from one aspect according to one embodiment of the present disclosure. FIG. 4B is a schematic view of the first charging head 300 and the second charging head 800 of FIG. 4A observed from another aspect. FIG. 4C is a schematic view of the first charging head 300 docking to the second charging head 800 in FIG. 4A. As shown in FIG. 4A and FIG. 4B, this embodiment is substantially the same as the above-mentioned embodiment, except that the second charging head 800 includes a single slot 811 recessed on the second surface 813 of the second case body 810, and any two of the second coils 840 are respectively located on two opposite inner surfaces 812 of the single slot 811. More specifically, these two second coils 840 are located in the second case body 810 side by side, that is, these two second coils 840 are overlapped with each other, and center axes A of these two second coils 840 are coaxial. The single slot 811 is interposed between these two second coils 840, and the inner surfaces 812 of the single slot 811 are passed through by the center axes A of these two second coils 840. It is noted, these two second coils 840 respectively located on the opposite inner surfaces 812 of the single slot 811 mentioned above is indicated that each of the second coils 840 can be installed in an inner space of the second case body 810 to be in contact with one of the inner surfaces 812, or to be located at a corresponding position approximated to one of the inner surfaces 812. Alternatively, each of the second coils 840 can be completely embedded inside a solid body of the second case body 810 to be in contact with one of the inner surfaces 812 or to be located at a corresponding position approximated to one of the inner surfaces 812.

Any two of the first coils 340 are respectively located on two opposite outer sides 320S of the first case body 320 of the first charging head 300 side by side, that is, these two first coils 340 are overlapped with each other, and center axes A of these two first coils 340 are coaxial. It is noted, these two first coils 340 respectively located on the outer sides 320S of the first case body 320 mentioned above is indicated that each of these two first coils 340 can be installed in an inner space of the first case body 320 to be in contact with one of the outer sides 320S, or to be located at a corresponding position approximated to one of the outer sides 320S. Alternatively, each of these two first coils 340 can be completely embedded inside a solid body of the first case body 320 to be in contact with one of the outer sides 320S or to be located at a corresponding position approximated to one of the outer sides 320S.

In this way, as shown in FIG. 4C, when the first case body 320 is moved into the single slot 811 as an insertion member, the first coils 340 are exactly interposed between the second coils 840, so that one of the first coils 340 at one side of the first case body 320 is overlapped with one of the second coils 840 and a separation is formed between the first coil 340 and the second coil 840, and an orthographic projection of the other first coil 340 at the other side of the first case body 320 is overlapped with an orthographic projection of the other second coil 840, and the other first coil 340 and the other side of the first case body 320, and a separation is formed between the other first coil 340 and the other second coil 840. Also, the center axes of the first coils 340 and the center axes of the second coils 840 are coaxial. In this way, the first charging head 300 can be positioned on the second charging head 800 more effectively.

More specifically, as shown in FIG. 4A and FIG. 4B, two outer sides 320S of the first case body 320 that are opposite to each other are respectively recessed with a first recessed area 321. Each of the first coils 340 is fixedly located inside the first case body 320 to face a bottom surface 322 of one of the first recessed areas 321. Two inner surfaces 812 of the single slot 811 that are opposite to each other are respectively recessed with a second recessed area 821, and each of the second coils 840 is respectively fixed inside the second case body 810 to face the bottom surface 823 of one of the second recessed areas 821. As shown in FIG. 4B and FIG. 4C, when the first case body 320 is moved into the single slot 811 of the second case body 810, the first recessed areas 321 on each of the outer sides 320S of the first case body 320 are in communication with the corresponding second recessed area 821, such that an air gap between the second coil 840 and the first coil 340 can be collectively defined by the first recessed area 321 and the second recessed area 821 which are in communication with each other.

It is noted, the first case body 320 is thick enough to block the inductive interference between the coils. In other words, an isolation body (such as metal) is provided between the first coils 340 at each side of the first case body 320.

Figure 5A:
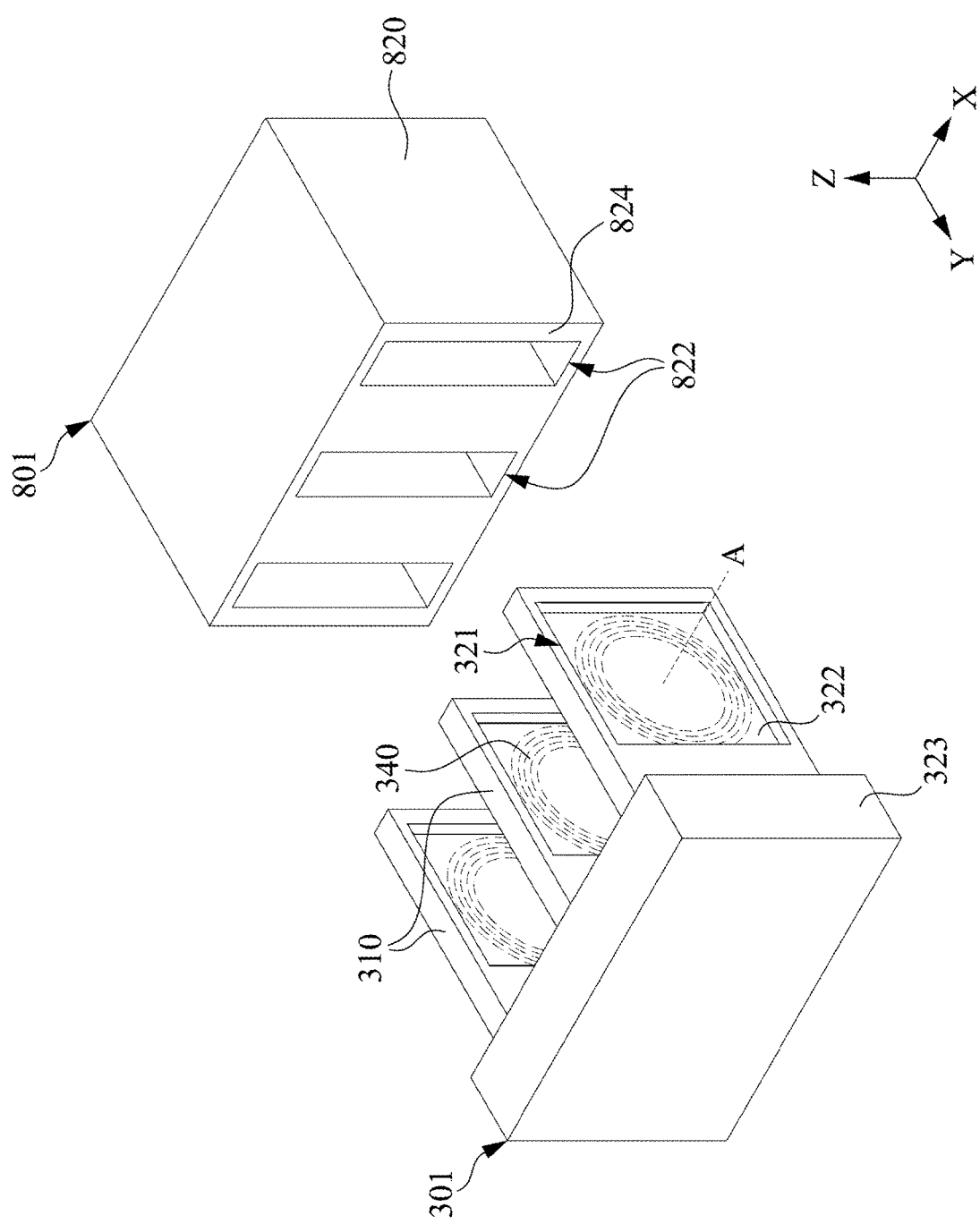
FIG. 5A is a schematic view of a first charging head and a second charging head, which is observed from one aspect according to one embodiment of the present disclosure.
Figure 5B:
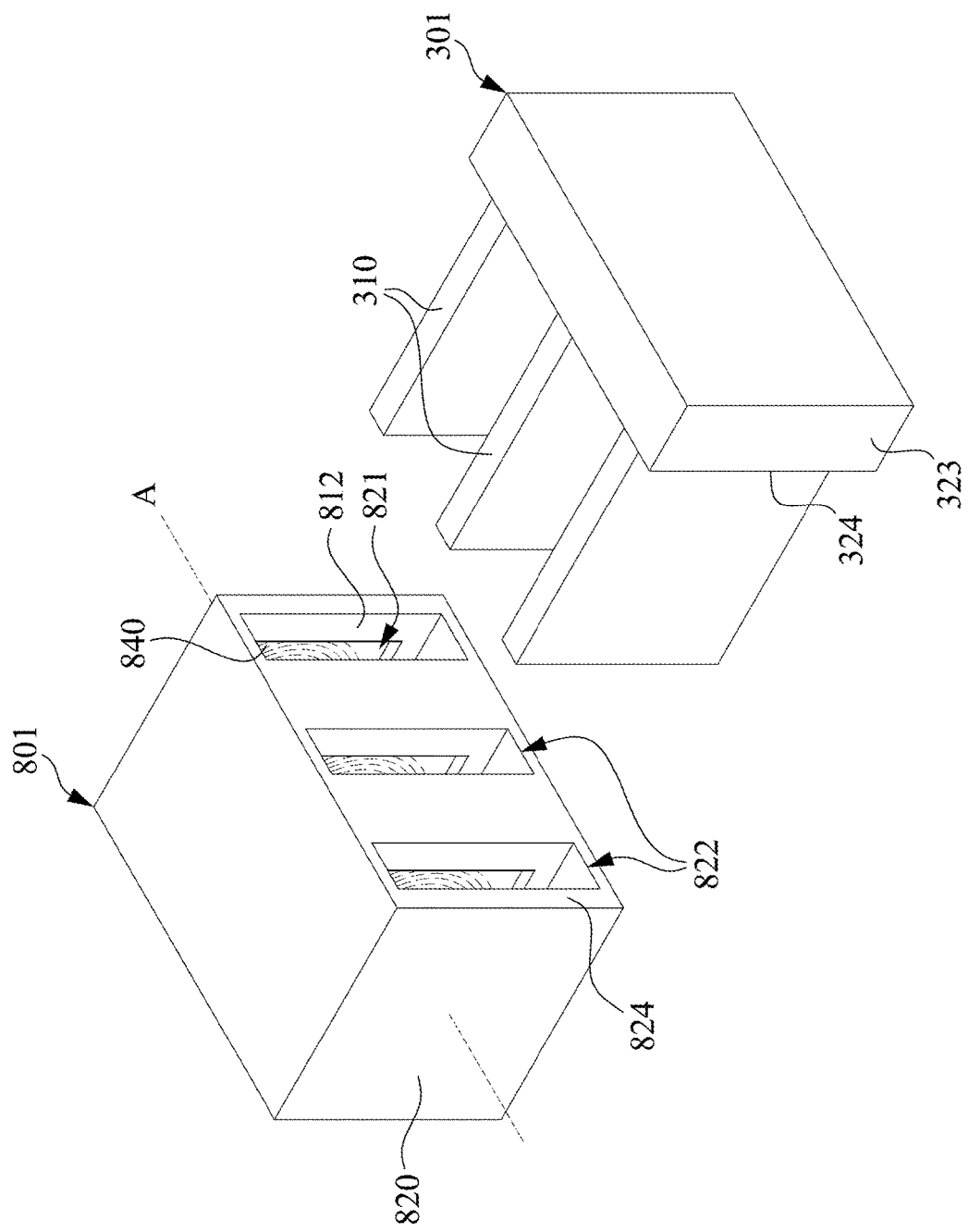
FIG. 5B is a schematic view of the first charging head and the second charging head of FIG. 5A observed from another aspect.

FIG. 5A is a schematic view of a first charging head 301 and a second charging head 801, which is observed from one aspect according to one embodiment of the present disclosure. FIG. 5B is a schematic view of the first charging head 301 and the second charging head 801 of FIG. 5A observed from another aspect. As shown in FIG. 5A and FIG. 5B, this embodiment is substantially the same as the above-mentioned embodiment, except that the second charging head 801 is recessed with a plurality of slots 822 (e.g., three) sequentially arranged on the second surface 824 of the second charging head 801 in the second extending direction (e.g., X axis direction) of the second surface 824 of the second case body 820. A plurality of second coils 840 (e.g., three) are overlapped one another, and installed inside the second case body 820. The second coils 840 have the same center axe A that are coaxial. More specifically, one of the second coils 840 is fixedly installed in the second case body 820 underneath the inner surface 812 at the same side of the slot 822. The first charging head 301 is provided with a plurality of insertion members 310 (e.g., three) sequentially arranged on the first surface 324 of the first case body 323 in the first extending direction (e.g., X axis direction) of the first surface 324. Each of the first coils 340 is installed in one of the insertion members 310 internally, and faces and closes to the outer side of the corresponding insertion member 310. The first coils 340 are overlapped with each other, and have center axe A that are coaxial. In other words, one of the first coils 340 is arranged in the same side of the insertion member 310. The number of the first coil 340 is the same as the number of the second coil 840. In this way, when the insertion members 310 respectively extend into the slots 822 one by one, each of the second coils 840 exactly faces the corresponding one of the first coils 340.

It is noted, an isolation body (such as metal) is provided between one of the first coils 340 in the corresponding one slot 822 and one of the second coils 840 in another slot 822, however, the disclosure is not limited thereto, in other embodiments, the isolation body described above may not be necessary, and is only provided with an air gap sandwiched between the first coil 340 and the second coil 840 to prevent inductive interference therebetween.

Figure 6:
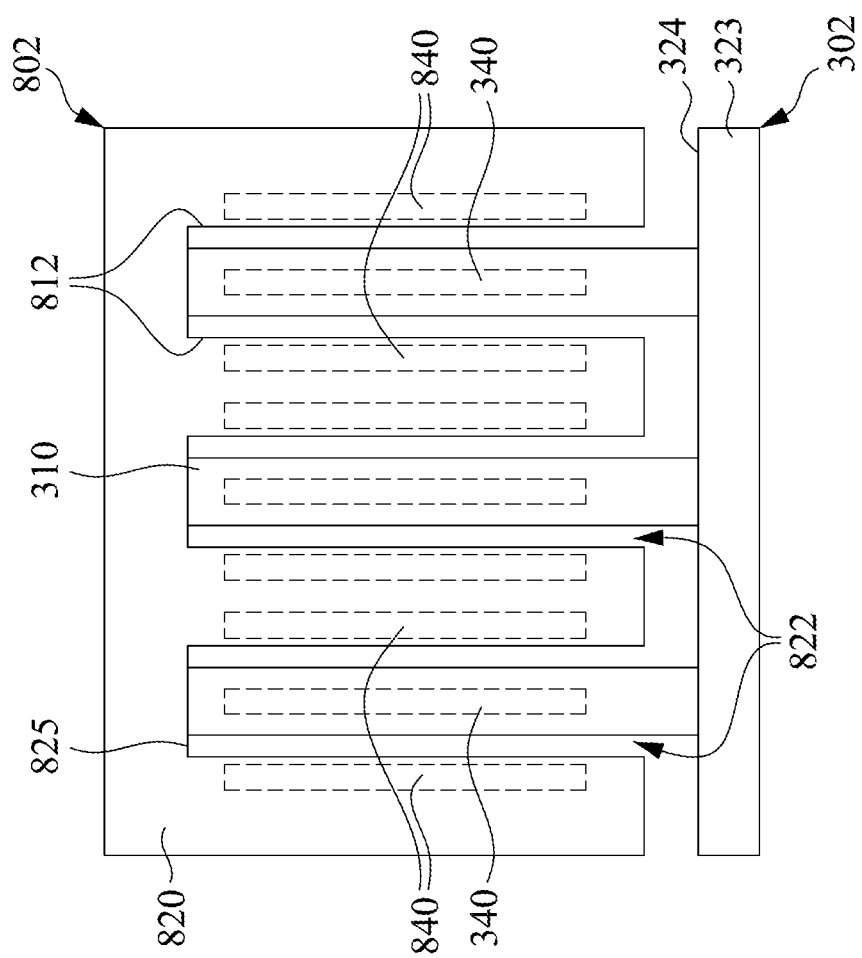
FIG. 6 is a schematic view of the first charging head docking to the second charging head according to one embodiment of the present disclosure.

FIG. 6 is a schematic view of the first charging head 302 docking to the second charging head 802 according to one embodiment of the present disclosure. As shown in FIG. 6, this embodiment is substantially the same as the above-mentioned embodiment, except that the opposite inner surfaces of each of the slots 822 are provided with one second coil 840, respectively. More specifically, only one first coil 340 is installed inside each of the insertion members 310, respectively. The number of the second coils 840 is greater than the number of the first coils 340. For example, the number of the first coils 340 is three, and the number of the second coils 840 is six. In this way, when the insertion members 310 respectively extend into the slots 822 one by one so that the insertion members 310 can be respectively abutted against the bottom surfaces 825 of the corresponding slots 822, each of the first coils 340 in one of the slots 822 is interposed between the two second coils 840 of the corresponding slot 822.

It is noted, since each of the first coils 340 is located in a middle position of the interior of the corresponding insertion member 310, a proper distance can be defined between the first coil 340 and the respect one of the second coils 840 on each side of the slots 822. Therefore, the corresponding position of the first charging head 302 may not be formed with the first recessed area of the foregoing embodiment, and the corresponding position of the second charging head 802 may not be formed with the second recessed area of the foregoing embodiment.

Figure 7A:
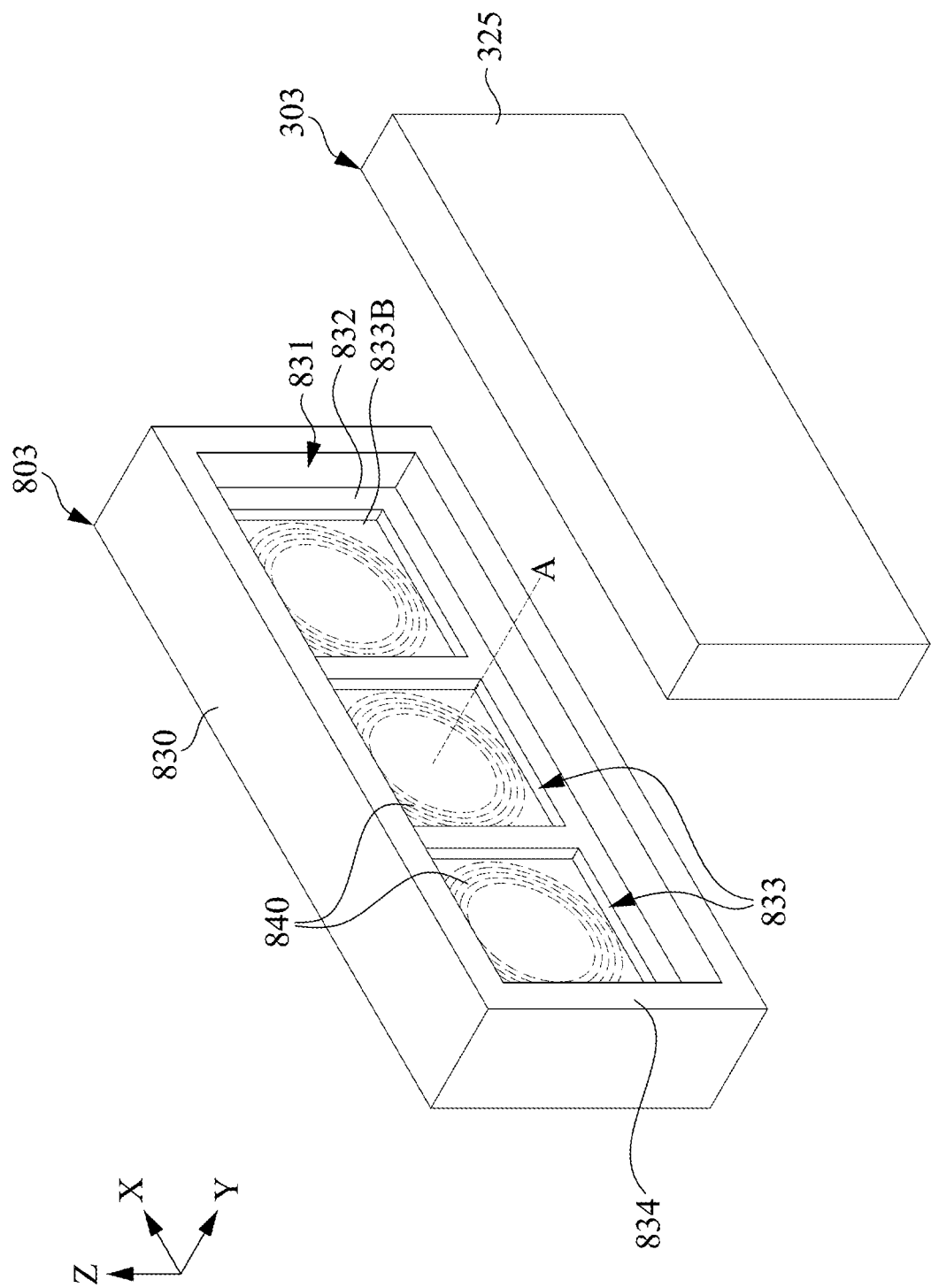
FIG. 7A is a schematic view of a first charging head and a second charging head, which is observed from one aspect according to one embodiment of the present disclosure.
Figure 7B:
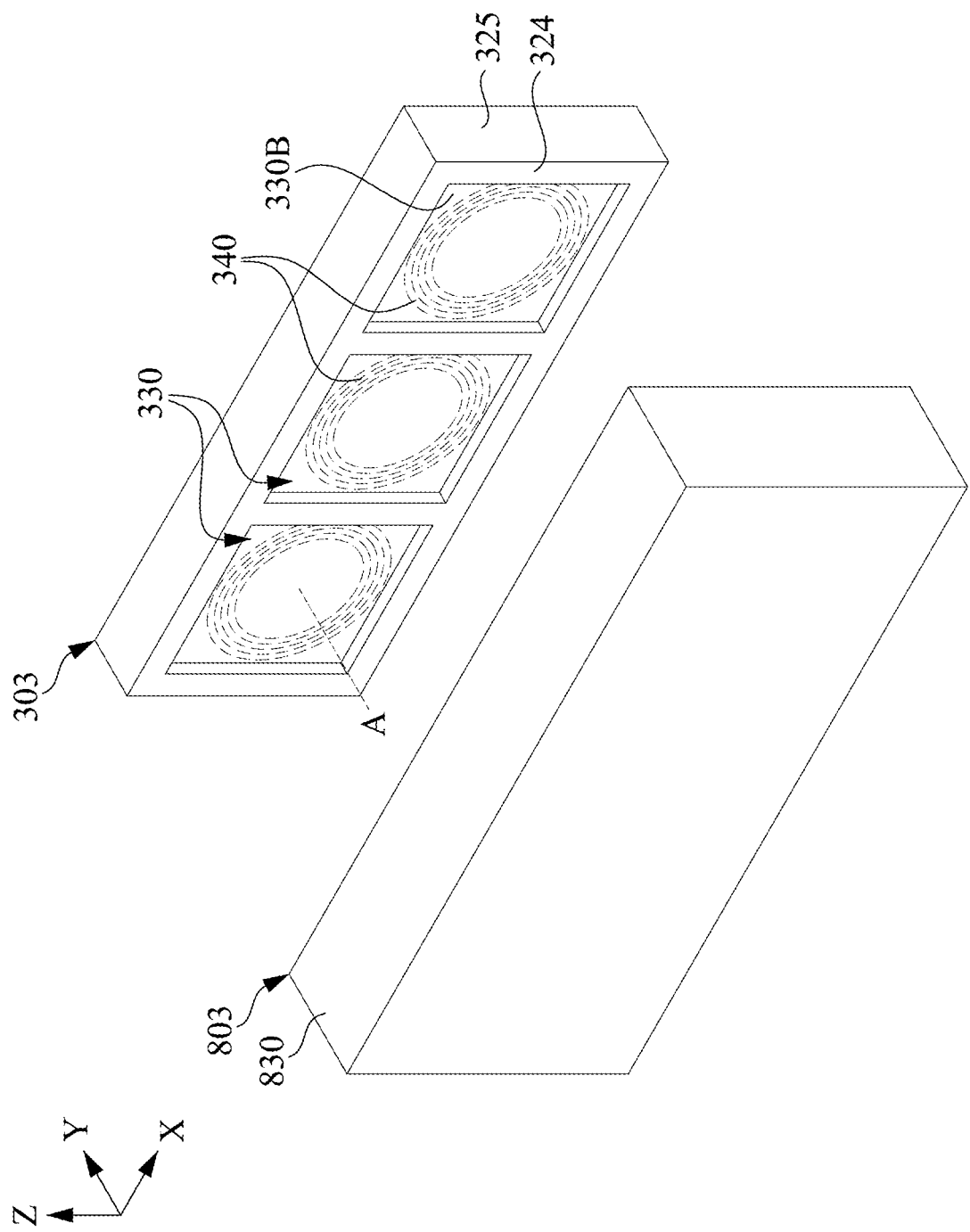
FIG. 7B is a schematic view of the first charging head and the second charging head of FIG. 7A observed from another aspect.
Figure 7C:
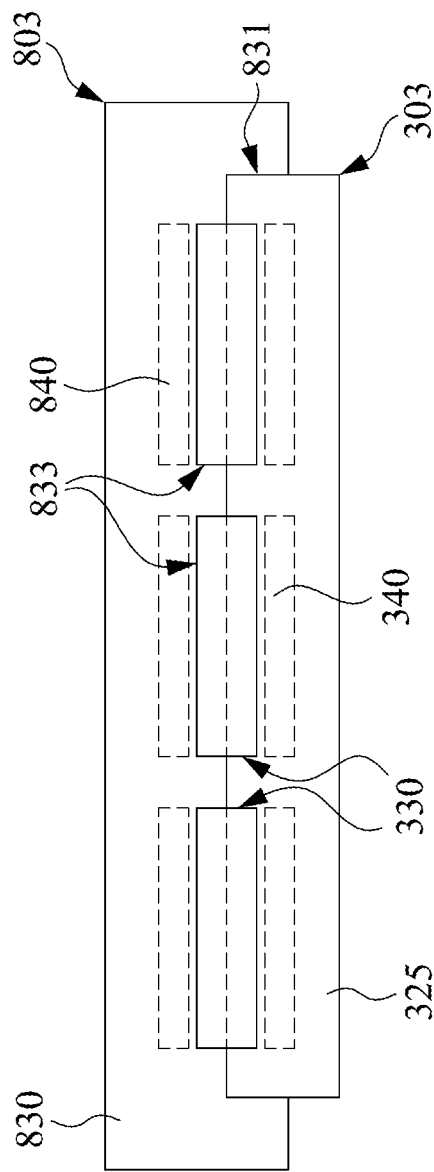
FIG. 7C is a schematic view of the first charging head docking to the second charging head in FIG. 7A.

FIG. 7A is a schematic view of a first charging head 303 and a second charging head 803, which is observed from one aspect according to one embodiment of the present disclosure. FIG. 7B is a schematic view of the first charging head 303 and the second charging head 803 of FIG. 7A observed from another aspect. FIG. 7C is a schematic view of the first charging head 303 docking to the second charging head 803 in FIG. 7A. As shown in FIG. 7A and FIG. 7B, the first charging head 303 includes a first case body 325 and a plurality of first concave portions 330. The first case body 325 is provided with a first surface 324, and the first surface 324 extends in the first extending direction (e.g., X axis direction), and the first concave portions 330 are arranged in a single row on the first surface 324 in the first extending direction (e.g., X axis direction). The first coils 340 are fixed (e.g., embedded or screwed) in the interior of the first case body 325. The first coils 340 respectively face and align with the bottom surfaces 330B of the first concave portions 330 one by one, and each of the first coils 340 is in contact with one of the bottom surfaces 330B or to be located at a corresponding position approximated to one of the bottom surfaces 330B. In other words, the center axes A of the first coils 340 are parallel one another, and the center axis A of each of the first coils 340 is perpendicular to one of the bottom surfaces 330B. Each of the first coils 340 is disposed behind one of the first concave portions 330 so as to be helpful to block the inductive interference between the coils.

The second charging head 803 includes a second case body 830, an elongated groove 831 and a plurality of second concave portions 833. The second case body 830 is provided with a second surface 834 on which the elongated groove 831 is formed. The area size of the elongated groove 831 is equal to the area size of the first surface 324 of the first case body 325. The second concave portions 833 are arranged sequentially on a bottom surface 832 of the elongated groove 831 in a long axis direction (e.g., X axis direction) of the elongated groove 831. The second coils 840 are fixed (e.g., embedded or screwed) in the second case body 830. The center axes A of the second coils 840 are parallel one another, and the center axis A of each of the second coils 840 perpendicular to the long axis direction (e.g., X axis direction) of the elongated groove 831. The second coils 840 respectively face and align with the bottom surface 833B of the second concave portions 833 one by one, and each off the second coils 840 is in contact with one of the bottom surfaces 833B or to be located at a corresponding position approximated to one of the bottom surfaces 833B. In other words, the center axes A of the second coils 840 are parallel one another, and the center axis A of each of the second coils 840 is perpendicular to one of the bottom surfaces 833B. Each of the second coils 840 is disposed behind one of the second concave portions 833 so as to be helpful to block the inductive interference between the coils. Thus, when the first case body 325 removably moves into the elongated groove 831, each of the second concave portions 833 is in communication with one of the first concave portions 330.

Figure 7E:
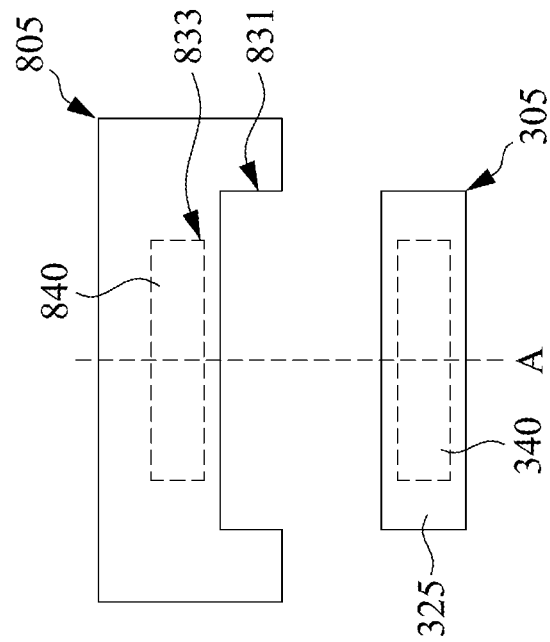
FIG. 7E is a schematic view of a first charging head and a second charging head according to one embodiment of the present disclosure.
Figure 7D:
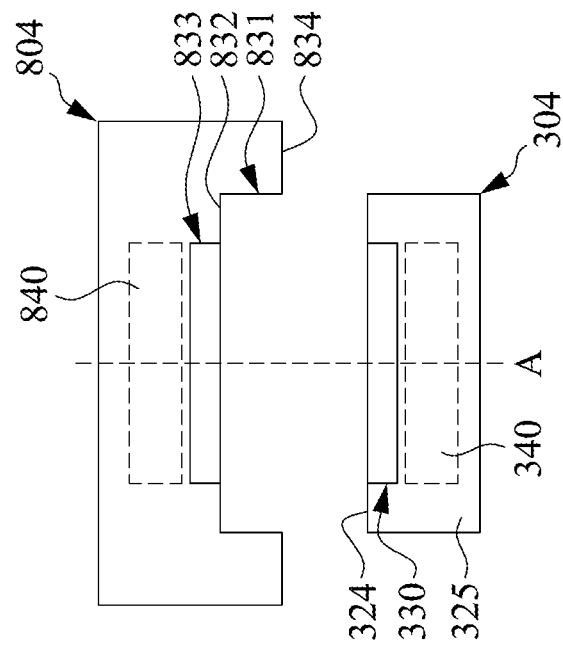
FIG. 7D is a schematic view of a first charging head and a second charging head according to one embodiment of the present disclosure.

However, the disclosure is not limited to the number of the first coils 340, the second coils 840, the first concave portions 330 and the second concave portions 833, FIG. 7D is a schematic view of a first charging head 304 and a second charging head 804 according to one embodiment of the present disclosure. As shown in FIG. 7D, in another embodiment, the first coil 340, the second coil 840, the first concave portion 330 and the second concave portion 833 may also be single, respectively. Thus, when the first charging head 304 docks to the second charging head 804, the first case body 325 is received into the elongated groove 831, the first concave portion 330 faces and communicates with the second concave portion 833, and the first coil 340 couples to the second coil 840 through the first concave portion 330 and the second concave portion 833, therefore, a center axis A of the first coil is coaxial to a center axis A of the second coil, and is parallel to the insertion direction (e.g., Y axis direction).

FIG. 7E is a schematic view of a first charging head 305 and a second charging head 805 according to one embodiment of the present disclosure. As shown in FIG. 7E, this embodiment is substantially the same as the above-mentioned embodiment of FIG. 7D, except that the first charging head 305 is provided without the first concave portion, and the second charging head 805 is provided without the second concave portion. Thus, when the first case body 325 is removably received into the elongated groove 831 along an insertion direction (e.g., Y axis direction), the first coil 340 is located in the elongated groove 831, and the first coil 340 couples to the second coil 840, a center axis A of the first coil is coaxial to a center axis A of the second coil, and is parallel to the insertion direction (e.g., Y axis direction).

Figure 8:
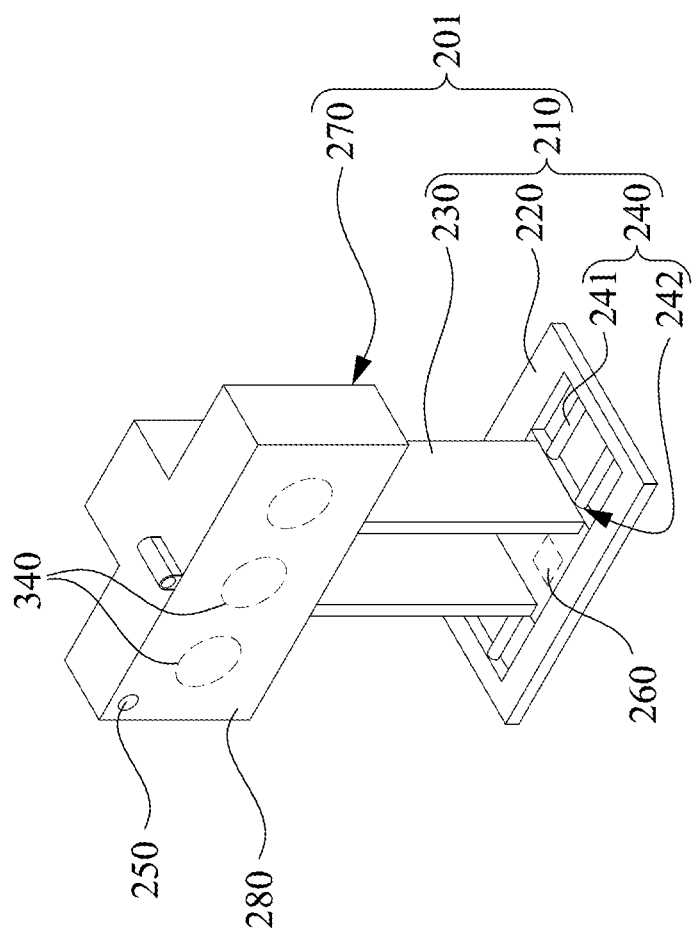
FIG. 8 is a perspective view of a charging station of the wireless charging system according to one embodiment of the present disclosure.

FIG. 8 is a perspective view of a charging station 201 of the wireless charging system 11 according to one embodiment of the present disclosure. As shown in FIG. 8, this embodiment is substantially the same as the above-mentioned embodiment of FIG. 1, except that the base 210 further includes a bottom seat 220, a bracket 230 and a transporting module 240. The bracket 230 is connected to the first charging head 280 and the bottom seat 220, respectively. The transporting module 240 is generally connected to the bottom seat 220 and the bracket 230 so as to move the first charging head 280 relative to the bottom seat 220. More specifically, the transporting module 240 can carry the first charging head 280 to move relatively along at least one of three-dimensional directions (e.g., X, Y and Z axes).

For example, the transporting module 240 includes sliding rods 241 and sliding passages 242. The sliding passages 242 are concavely formed on the bracket 230. Each of the sliding rods 241 is gone through one of the sliding passages 242 and fixed to the bottom seat 220. In this way, the first charging head 280 on the bracket 230 can be moved relatively along the X axis by moving the bracket 230 linearly along the sliding rod 241. In other embodiments, the transporting module 240 also can move the first charging head 280 on the bracket 230 in the Z-axis direction in a similar manner.

The base 210 further includes a power motor 260. A detector 250 installed on the first charging head 280 can detect the real-time stop position of the moving apparatus 600. The power motor 260 is connected to the transporting module 240 and the detector 250, and is used to drive the transporting module 240 to relatively move along at least one of the three-dimensional directions (e.g., X, Y, and Z axes) according to the detection signal of the detector 250.

However, the disclosure is not limited thereto, in another embodiment, the charging station 201 also can be used for another first charging head having a single first coil 340.

Figure 9:
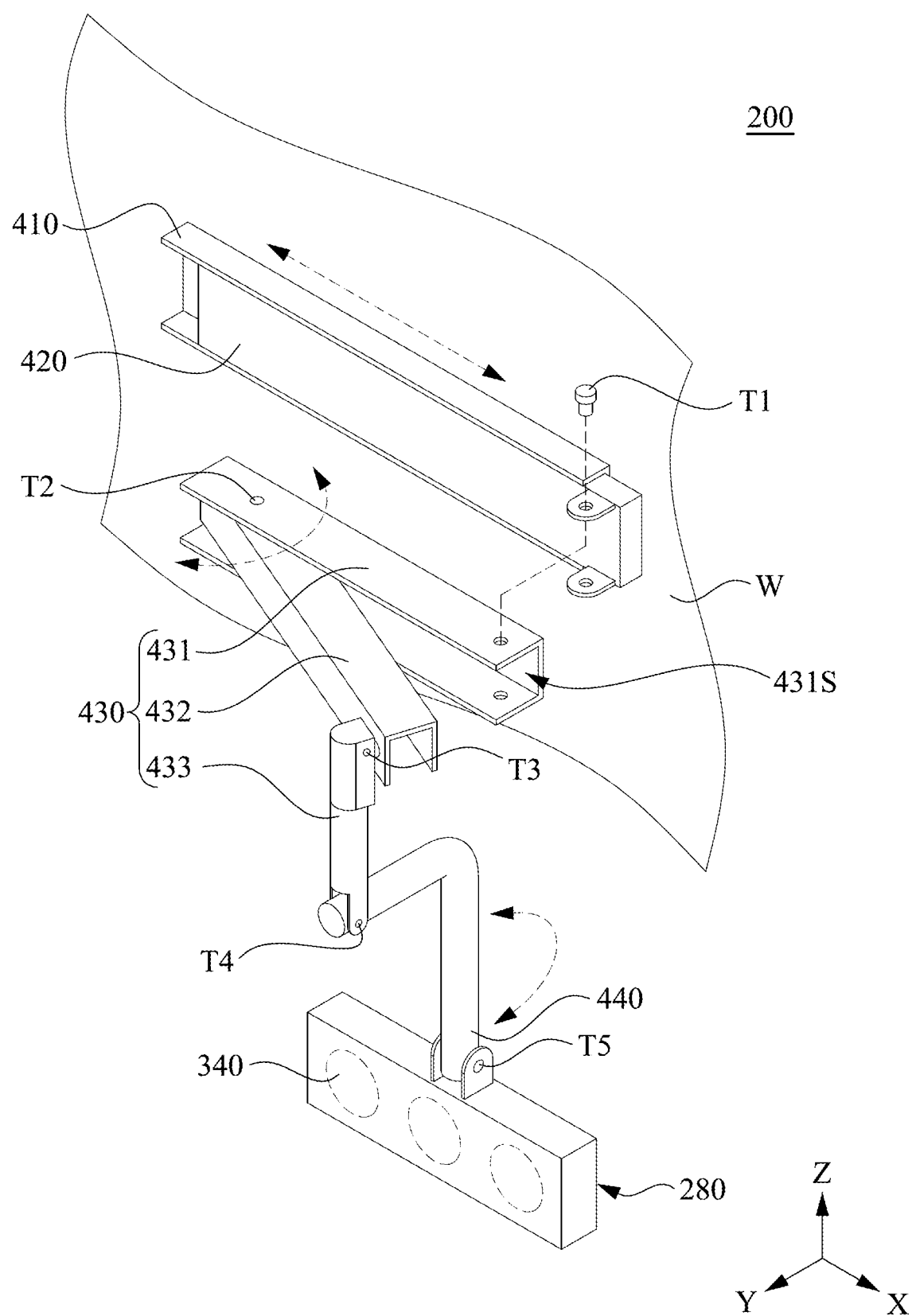
FIG. 9 is a perspective view of a charging station of the wireless charging system according to one embodiment of the present disclosure.

FIG. 9 is a perspective view of a charging station 200 of the wireless charging system according to one embodiment of the present disclosure. As shown in FIG. 9, this embodiment is substantially the same as the above-mentioned embodiment of FIG. 1, except that the charging station 200 further includes a stationary frame 410, a sliding rail 420, a folding module 430 and a linking member 440. The stationary frame 410 is used to fix on an object (e.g., wall W). The sliding rail 420 is slidably disposed on the stationary frame 410. The folding module 430 includes a first arm 431, a second arm 432 and a third arm 433. One end of the first arm 431 is pivotally connected to the sliding rail 420 through a pivot T1, the other end of the first arm 431 is pivotally connected to one end of the second arm 432 through a pivot T2. One end of the third arm 433 is pivotally connected to the other end of the second arm 432 through a pivot T3, and the second arm 432 and the third arm 433 are orthogonal to each other. The linking member 440 is L-shaped in which one end of the linking member 440 is pivotally connected to the other end of the third arm 433 through a pivot T4, and the other end of the linking member 440 is pivotally connected to the base 210 through a pivot T5. The linking member 440 is rotatable relative to the third arm 433 for moving the first charging head 280.

Thus, the sliding rail 420 can move the folding module 430, the linking member 440 and the first charging head 280 to move linearly in the lateral direction (e.g., X axis) by sliding the sliding rail 420 relative to the stationary frame 410.

According to the way of rotation around the pivots T1 and T2, the first arm 431 and the second arm 432 are allowed to rotate to expand or shrink the total size of the first arm 431 and the second arm 432 so that the first charging head 280 approaches or moves away from the stationary frame 410 in the Y-axis direction. In addition, when the sliding rail 420, the first arm 431 and the second arm 432 are folded together, the second arm 432 is allowed to be received into a strip groove 431S of the first arm 431 so as to reduce the total size of the folding module 430 and save storage space. Furthermore, by rotating the third arm 433 around the pivot T3, the third arm 433 can drive the linking member 440 and the first charging head 280 to rotate. By rotating the linking member 440 around the pivot T4, the linking member 440 moves the first charging head 280 to rotate. By rotating the first charging head 280 around the pivot T5, the first charging head 280 is rotatable relative to the linking member 440.

In this way, the user can operate at least one of the sliding rail 420, the folding module 430 and the linking member 440 to align with the second charging head of the moving apparatus (see FIG. 1).

However, the disclosure is not limited thereto, in another embodiment, the charging station 200 also can be used for another first charging head having a single first coil 340.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A wireless charging system, comprising:
   a power transmitting module, comprising:
   a first charging head comprising a first case body having a first surface thereon, and a plurality of first concave portions disposed on the first surface of the first case body; and
   a plurality of first coils located on the first charging head and connected in parallel with each other, wherein the first coils are respectively arranged in the first case body, and each of the first coils is embedded inside the first case body beneath the first concave portions to face one of the first concave portions; and a power receiving module, comprising:
  a second charging head comprising a second case body having a second surface thereon, and a plurality of second concave portions disposed on the second surface; and
  a plurality of second coils located on the second charging head and connected in parallel with each other, wherein the second coils are respectively arranged in the second case body, and each of the second coils is embedded inside the second case body beneath the second concave portions to face one of the second concave portions,
  wherein when the first charging head docks to the second charging head, each of the first coils faces and couples to one of the second coils.

2. The wireless charging system of claim 1, wherein the first charging head is provided with a first surface on which the first coils are sequentially arranged, wherein each of the first coils has a center axis, and the center axes of the first coils are parallel to each other; and
  the second charging head is provided with a second surface on which the second coils are sequentially arranged, wherein each of the second coils has a center axis, and the center axes of the second coils are parallel to each other,
  wherein when the first charging head docks to the second charging head, the second surface faces the first surface, and the center axis of each of the first coils is coaxial to the center axis of one of the second coils.

3. The wireless charging system of claim 1, wherein the first coils are arranged in the first charging head, each of the first coils has a center axis, and the center axes of the first coils are coaxial; and
  the second coils are arranged in the second charging head, each of the second coils has a center axis, and the center axes of the second coils are coaxial,
  wherein when the first charging head docks to the second charging head, the first coils are located between the second coils, and the center axes of the first coils and the center axes of the second coils are coaxial.

4. The wireless charging system of claim 1, wherein the second charging head is formed with a slot, the second coils are disposed in the second charging head, and the slot is disposed between the second coils; and
  the first charging head is provided with an insertion member, the first coils are disposed in the insertion member, each of the first coils has a center axis, and the center axes of the first coils are coaxial,
  wherein when the first charging head docks to the second charging head, the insertion member extends into the slot so that the center axis of each of the first coils is coaxial to the center axis of a corresponding one of the second coils.

5. The wireless charging system of claim 4, wherein the slot is provided with two inner surfaces which are opposite to each other, and the second coils faces the inner surfaces, respectively; and
  the insertion member is provided with two outer sides which are opposite to each other, and the first coils faces the outer sides of the insertion member, respectively.

6. The wireless charging system of claim 1, wherein the second charging head is formed with a plurality of slots sequentially arranged on one surface of the second charging head, and each of the slots is provided with two inner surfaces which are opposite to each other, and the inner surfaces of each of the slots are respectively installed with one of the second coils; and
  the first charging head is provided with a plurality of insertion members, and each of the insertion members is installed with one of the first coils,
  when the insertion members extend into the slots, respectively, each of the first coils is interposed between two neighboring ones of the second coils.

7. The wireless charging system of claim 1, wherein the second charging head is formed with a plurality of slots sequentially arranged on one surface of the second charging head, and each of the slots is provided with two inner surfaces which are opposite to each other, and one of the inner surfaces of each of the slots is installed with one of the second coils; and
  the first charging head is provided with a plurality of insertion members, and one side of each of the insertion members is installed with one of the first coils,
  when the insertion members extend into the slots, respectively, each of the second coils of one of the slots faces the one of the first coils of the corresponding one of the insertion members.

8. The wireless charging system of claim 7, wherein an isolation body is provided between two adjacent ones of the first coils or two adjacent ones of the second coils.

9. The wireless charging system of claim 1, wherein a center axis of each of the first coils is perpendicular to the first surface; and
  the second charging head comprises:
  an elongated groove formed on the second surface for receiving the first case body,
  and a center axis of each of the second coils is perpendicular to the second surface.

10. A wireless charging system, comprising:
  a power transmitting module, comprising:
    a first charging head comprising a first case body having a first surface thereon, and a plurality of first concave portions disposed on the first surface of the first case body; and
    a plurality of first coils connected in parallel with each other and embedded inside the first case body beneath the first concave portions to face one of the first concave portions, and a center axis of each of the first coils being perpendicular to the first surface; and
  a power receiving module, comprising:
    a second charging head comprising a second case body having a second surface thereon, and a groove formed on the second surface, and a plurality of second concave portions disposed on a bottom surface of the groove to be in communication with the groove; and
    a plurality of second coils embedded inside the second case body beneath the second concave portions to face the second concave portions inside the second case body and facing the groove, wherein a center axis of each of the second coils is perpendicular to the second surface,
    wherein when the first charging head docks to the second charging head, the first case body is received into the groove, and each of the first coils couples to one of the second coils through the first concave portion and the second concave portion.

11. The wireless charging system of claim 10, wherein the groove is an elongated groove, wherein when the first case body is received into the elongated groove along an insertion direction, the first concave portion and the first coil are located in the elongated groove so that the center axis of the first coil is parallel to the insertion direction.

12. The wireless charging system of claim 10, wherein the power transmitting module further comprising:
a base comprising an accommodating recess for removably accommodating the first charging head therein.

13. The wireless charging system of claim 12, wherein the base further comprises a first portion, a second portion and a transporting module, the charging head is disposed on the first portion, and the transporting module is connected to the first portion and the second portion for moving the first charging head relative to the second portion.

14. A charging station, comprising:
a base comprising a charging head comprising a case body having a surface thereon, and a plurality of concave portions disposed on the surface of the case body; and
a plurality of first coils located on the charging head and connected in parallel with each other for facing and coupling to second coils of a moving apparatus, wherein the first coils are respectively arranged in the case body, and a center axis of each of the first coils is perpendicular to the surface of the case body, and each of the first coils is embedded inside the case body beneath the concave portions to face one of the concave portions.

15. The charging station of claim 14, wherein the first coils are sequentially arranged in the charging head, and the center axes of the first coils are parallel to each other.

16. The charging station of claim 14, wherein the first coils are sequentially arranged in the charging head, and the center axes of the first coils are coaxial.

17. The charging station of claim 14, wherein the base further comprises:
an accommodating recess formed on the base for removably accommodating the charging head therein.

18. The charging station of claim 14, wherein the base further comprises a first portion, a second portion and a transporting module, the charging head is disposed on the first portion, and the transporting module is connected to the first portion and the second portion for moving the charging head relative to the second portion.

19. The wireless charging system of claim 4, wherein an insertion direction of the insertion member extending into the slot is perpendicular to the center axis of each of the first coils.

20. The wireless charging system of claim 10, wherein each of the first coils is corresponded to one of the first concave portions within the groove, and all of the first coils are corresponded to the groove.

* * * * *